(12) United States Patent
Gomyo et al.

(10) Patent No.: US 7,327,066 B2
(45) Date of Patent: Feb. 5, 2008

(54) MOTOR AND RECORDING DISK DRIVE DEVICE PROVIDED WITH THE SAME

(75) Inventors: Masato Gomyo, Kyoto (JP); Mineo Kurita, Kyoto (JP); Masayoshi Saichi, Kyoto (JP)

(73) Assignee: Nidec Corporation, Minami-ku, Tokyo (JP)

( * ) Notice: Subject to any disclaimer, the term of this patent is extended or adjusted under 35 U.S.C. 154(b) by 0 days.

(21) Appl. No.: 11/307,964

(22) Filed: Mar. 1, 2006

(65) Prior Publication Data

US 2006/0197402 A1 Sep. 7, 2006

(30) Foreign Application Priority Data

| | | |
|---|---|---|
| Mar. 1, 2005 | (JP) | 2005-056407 |
| Feb. 8, 2006 | (JP) | 2006-030452 |
| Feb. 28, 2006 | (JP) | 2006-052581 |

(51) Int. Cl.
*H02K 1/00* (2006.01)

(52) U.S. Cl. ...................... 310/216; 310/258

(58) Field of Classification Search ........ 310/216–218, 310/258, 67 R
See application file for complete search history.

(56) References Cited

U.S. PATENT DOCUMENTS

| | | | | |
|---|---|---|---|---|
| 5,604,389 A | * | 2/1997 | Nitta et al. | 310/67 R |
| 6,181,041 B1 | * | 1/2001 | Nose | 310/164 |
| 6,362,553 B1 | * | 3/2002 | Nakahara et al. | 310/254 |
| 6,979,931 B1 | * | 12/2005 | Gustafson et al. | 310/254 |

FOREIGN PATENT DOCUMENTS

JP H04-251541 A 9/1992

\* cited by examiner

*Primary Examiner*—Thanh Lam
(74) *Attorney, Agent, or Firm*—Volentine & Whitt, PLLC

(57) ABSTRACT

In a spindle motor, a core (33) includes a plurality of core plates (34), which are laminated one on another. The core (33) is constituted by laminating two cores, that is, a first core (34a) and a second core (34b), which are different from each other in shape of a surface facing to a rotor magnet (32). At least a part of a cogging torque generated at the second core (34b) can be cancelled by a cogging torque generated at the first core (34a).

4 Claims, 15 Drawing Sheets

FIG. 8A  33b  FIG. 8B

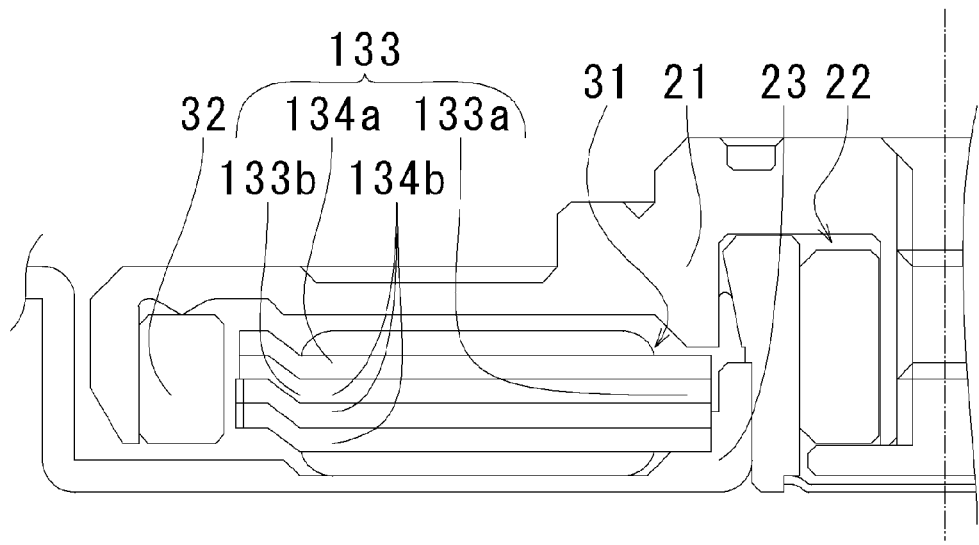
FIG. 11A
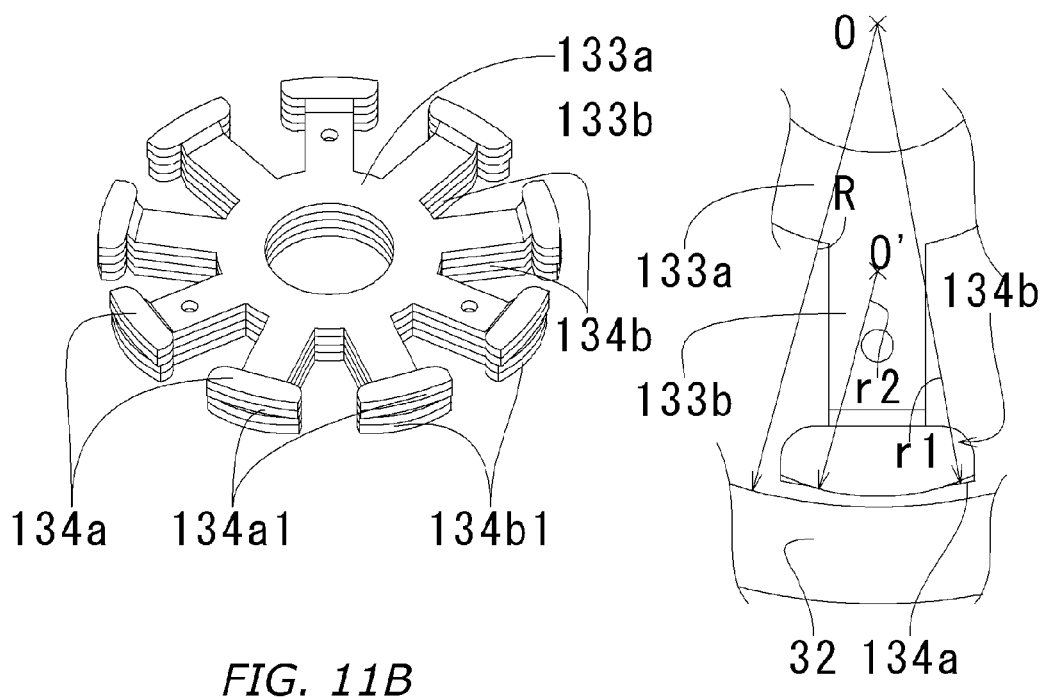
FIG. 11B
FIG. 11C

MOTOR AND RECORDING DISK DRIVE DEVICE PROVIDED WITH THE SAME

BACKGROUND OF THE INVENTION

1. Technical Field

The present invention relates to a motor provided with a plurality of magnetic pole teeth in a stator. In particular, the present invention relates to a spindle motor for use in rotating a recording disk, in which demands for reduction in size and thickness can be achieved.

2. Background Art

1. Recent Trends

In recent years, as the memory capacity density of a hard disk is increased, further miniaturization of a hard disk drive has been demanded. Furthermore, developed application to portable equipment has required for durability against a vibration or a shock from the outside. Therefore, a rigidity of a predetermined value or greater has been required for a bearing, thereby enlarging a bearing loss. In the meantime, the portable equipment need be reduced in consumption of electric power in order to prolong a continuous use period of time. For the purpose of simultaneous satisfaction of these demands, a motor driving efficiency need be enhanced.

2. Structure of Spindle Motor

As a spindle motor has been generally used a DC brushless motor. The brushless motor has included a stator, an assembly on a fixing side, onto which the stator is fixed, a rotor magnet, a rotor, to which the rotor magnet is fixed, and a bearing.

Among these members, the stator has included a plurality of magnetic pole teeth, a back yoke which magnetically connects the outer peripheries or inner circumferences of the magnetic pole teeth to each other, and a coil which is wound around each of the magnetic pole teeth. Each of the magnetic pole teeth and the back yoke has been formed by laminating a plurality of silicone steel core plates having a very high magnetic permeability. The rotor magnet has been an annular permanent magnet. The rotor magnet has been arranged with respect to the stator in such a manner as to be opposite to an inner circumferential surface in a radial direction on a side reverse to the back yoke of the magnetic pole tooth. The rotor, to which the rotor magnet is fixed, has been rotatably supported by a bearing mechanism with respect to the stator assembly, to which the stator is fixed.

3. Structure in the Prior Art

In order to reduce the thickness of a motor without any decrease in torque of the motor, Patent Literature 1 discloses a structure, in which an end on a side opposite to a rotor magnet in a stator is bent in an axial direction. In this way, an area of a magnetic pole tooth in the stator, facing to the rotor magnet in a radial direction has become greater, thereby efficiently using a magnetic flux of the rotor magnet. In other words, a torque constant has been increased. As a consequence, since an equal torque can be obtained even if a current flowing in a coil is decreased, consumption of electric force can be reduced.

4. Problems Experienced by the Prior Art

At the same time when torque is to be increased, torque variations called cogging have been liable to occur. In particular, in the case of a spindle motor for use in rotating a recording disk, the occurrence of cogging has degraded a reading accuracy by the recording disk. For example, when the torque constant is increased in the above-described manner, there has been well known the occurrence of the torque variations called cogging or an enlarged electromagnetic noise. As a result, it has been difficult to enhance the torque of the spindle motor for rotating the recording disk.

BRIEF SUMMARY OF THE INVENTION

According to the present invention, in configuring a magnetic pole tooth, at least two cores having cogging waveforms different from each other are laminated one on another. The cogging waveform in a motor is formed by combining the cogging waveforms of the cores. At this time, respective shapes of a first core and a second core are selected such that the cogging waveforms have phases reverse to each other. In this way, the combined cogging waveform can be reduced. The cogging waveform can be more readily adjusted by adjusting the shapes of the two kinds of cores in comparison with the use of only one kind of core.

An arcuate shape may be selected as the shape of each of tips of the cores to be laminated one on another. The cogging waveform can be adjusted by laminating the cores having curvatures of arches different from each other. At this time, the tip of either one of the cores may be straight.

Moreover, the tip of either one of the cores may be bent into a vertical portion in such a manner as to face to a rotor magnet. With this configuration, a large torque can be obtained. The cogging waveform can be adjusted by laminating the other properly curved core at the tip. A bent portion may be straight or curved according to a design requirement.

Although machining somewhat becomes complicated, the height of the vertical portion (i.e., a width in a vertical direction) may be varied along a circumferential direction. The core is configured in such a manner as to be high in the vicinity of a center while be lower toward both ends, and then, a more excellent cogging waveform can be obtained by laminating the other core.

A method according to the present invention is particularly effective in using for reduction of a cogging torque in a 3-phase drive DC brushless motor. At this time, the method according to the present invention is applied to a motor provided with a converged coil, thus more prominently producing advantageous results.

Incidentally, a cogging torque waveform of a core signifies a torque measured with respect to a rotational angle, which is required for rotating the rotor magnet in a state in which no current is supplied to a coil wound around the core. The cogging torque waveform is markedly influenced by a magnetized waveform of the rotor magnet and a shape of an end of a magnetic pole of the core.

A highly efficient motor having an enhanced torque can be achieved by the present invention. At the same time, the cogging can be reduced. As a consequence, an electromagnetic noise caused by the cogging is small. In addition, a motor having such a small cogging torque can be designed and fabricated with relative ease. Furthermore, a spindle motor of a high efficiency with a reduced cogging or a small electromagnetic noise can be fabricated by using the above-described motor.

Other features, elements, advantages and characteristics of the present invention will become more apparent from the following detailed description of preferred embodiments thereof with reference to the attached drawings.

BRIEF DESCRIPTION OF THE SEVERAL VIEWS OF THE DRAWINGS

FIGS. 8A to 8D are perspective views showing essential parts of a core in a spindle motor in another preferred embodiment according to the present invention;

FIGS. 11A to 11C are views showing a spindle motor in a fourth preferred embodiment according to the present invention.

DETAILED DESCRIPTION OF THE INVENTION

Figure 1:
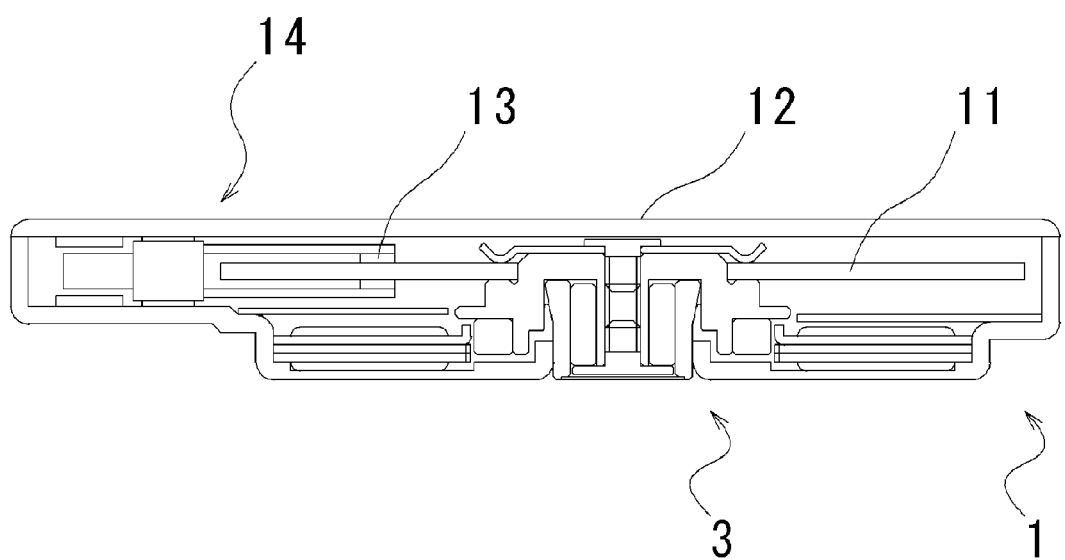
FIG. 1 is a cross-sectional view showing a hard disk drive according to the present invention.

A description will be given below of preferred embodiments of a spindle motor for use in a hard disk drive as a motor which embodies the present invention with reference to the attached drawings. Here, terms "upper, lower, right, left, back and front" in the descriptions given of the preferred embodiments designate directions in the drawings, and therefore, they should not limit directions in the case where the present invention is actually embodied. In particular, the terms "upper and lower" designate a vertical direction in FIG. 2, as long as not specially noted. In addition, "an axis" signifies a rotational center axis of a rotor, and therefore, is substantially the same as the center of a core or a rotor magnet.

First Preferred Embodiment 1-1 Configurations of Hard Disk Drive and Spindle Motor FIG. 1 shows a hard disk drive 1 according to the present invention, which is configured by using a spindle motor, which embodies the present invention. The hard disk drive 1 configured by using a spindle motor 3 according to the present invention contains, in a casing 12, an information recordable hard disk 11, a head 13, which reads or writes information stored in the disk, and a head assembly 14, which supports the head 13 and moves it to an arbitrary position on the disk.

Figure 2:
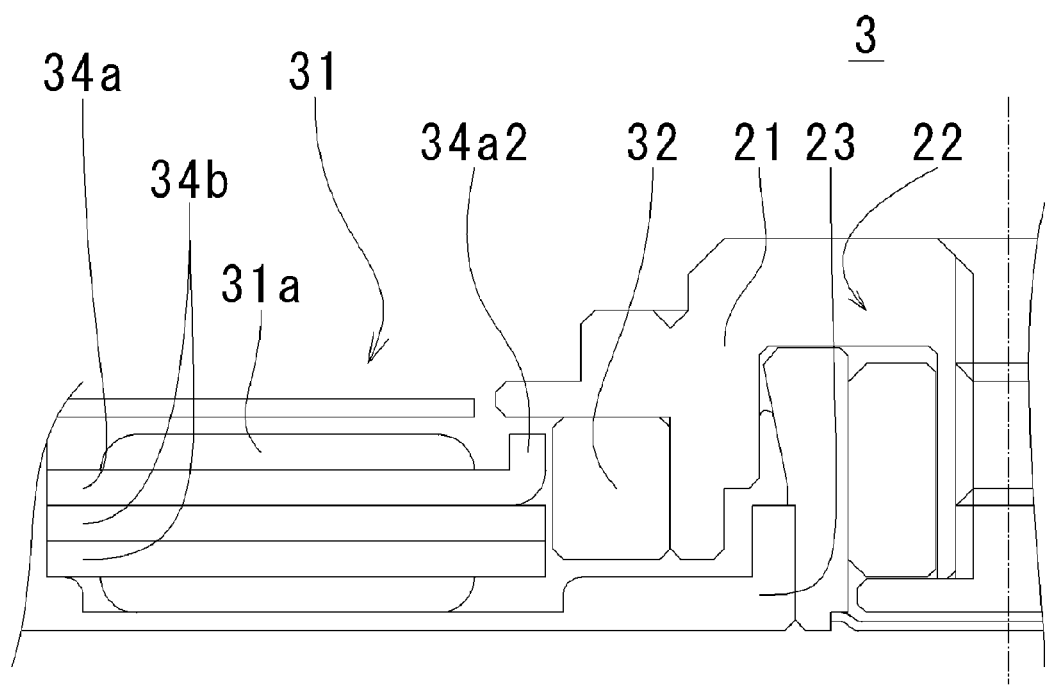
FIG. 2 is a cross-sectional view showing a spindle motor in a first preferred embodiment according to the present invention.

Furthermore, FIG. 2 shows the spindle motor 3 in a first preferred embodiment according to the present invention. The spindle motor 3 includes a rotor hub 21 provided with a mounting surface, on which the hard disk 11 is mounted, a base plate 23 serving as a part of the casing 12 and a base portion of the spindle motor 3, and a bearing 22 for rotatably supporting the rotor hub 21 with respect to the base plate 23.

The bearing 22 is constituted of a shaft, a sleeve freely fitted to the shaft, and a lubricant interposed between the shaft and the sleeve. In addition, at the sleeve is formed a dynamic pressure generating groove, thus configuring a dynamic pressure bearing.

1-2 Configuration of Drive Unit

A drive unit of the spindle motor 3 includes a stator 31 having a coil 31a wound around a core 33, and a rotor magnet 32 made of an annular permanent magnet. The present preferred embodiment adopts a motor of an inner rotor type, in which the rotor magnet 32 is positioned on an inner circumferential side of the stator 31. However, it is to be understood that the present invention should be applied also to a spindle motor of an outer rotor type. The rotor magnet 32 is magnetized in a radial direction in such a manner that a plurality of magnetic poles are arranged in a circumferential direction. The spindle motor 3 having the above-described configuration in the present preferred embodiment is a DC brushless motor.

1-3 Shape of Stator

Figure 3A:
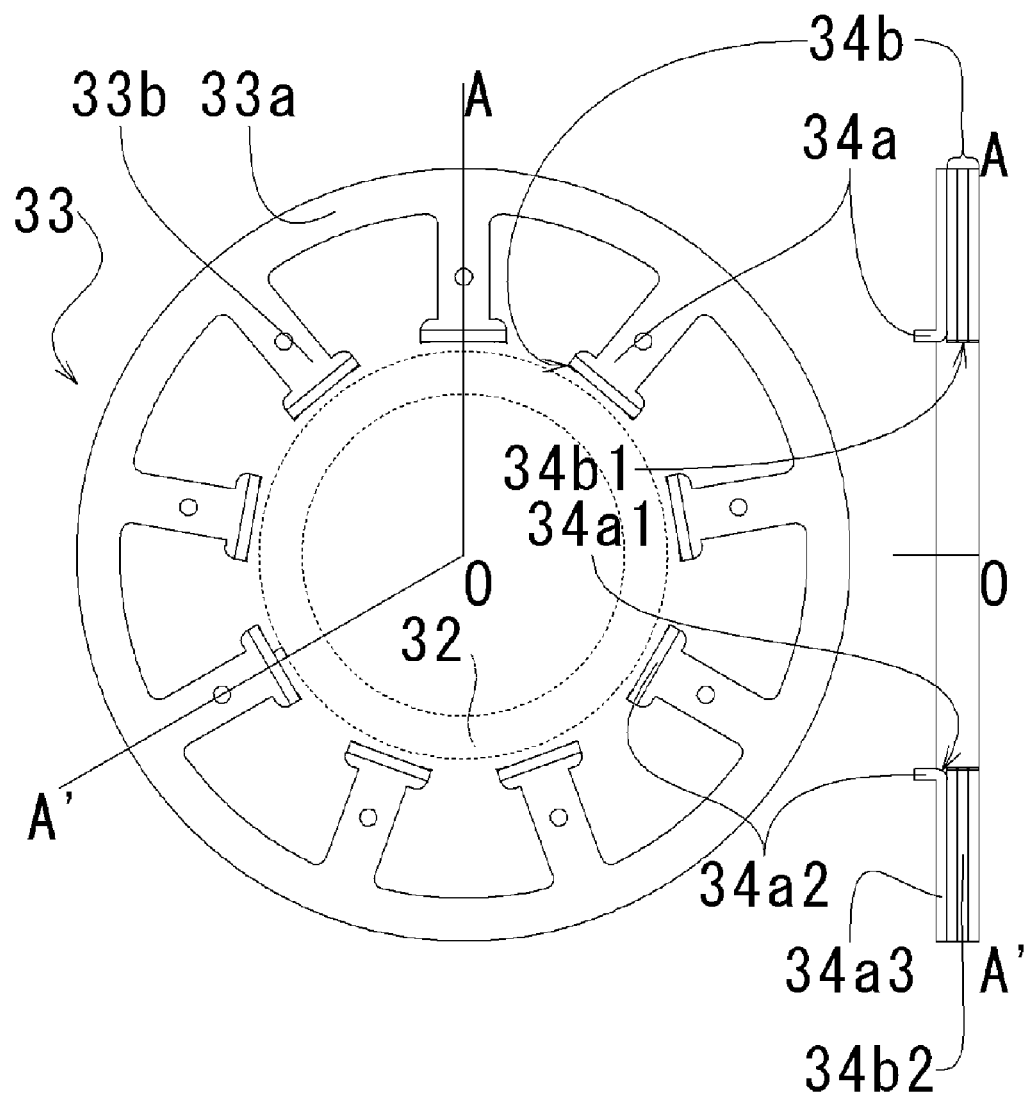
FIG. 3A is a plan view showing a core in the spindle motor in the first preferred embodiment according to the present invention.
Figure 3B:
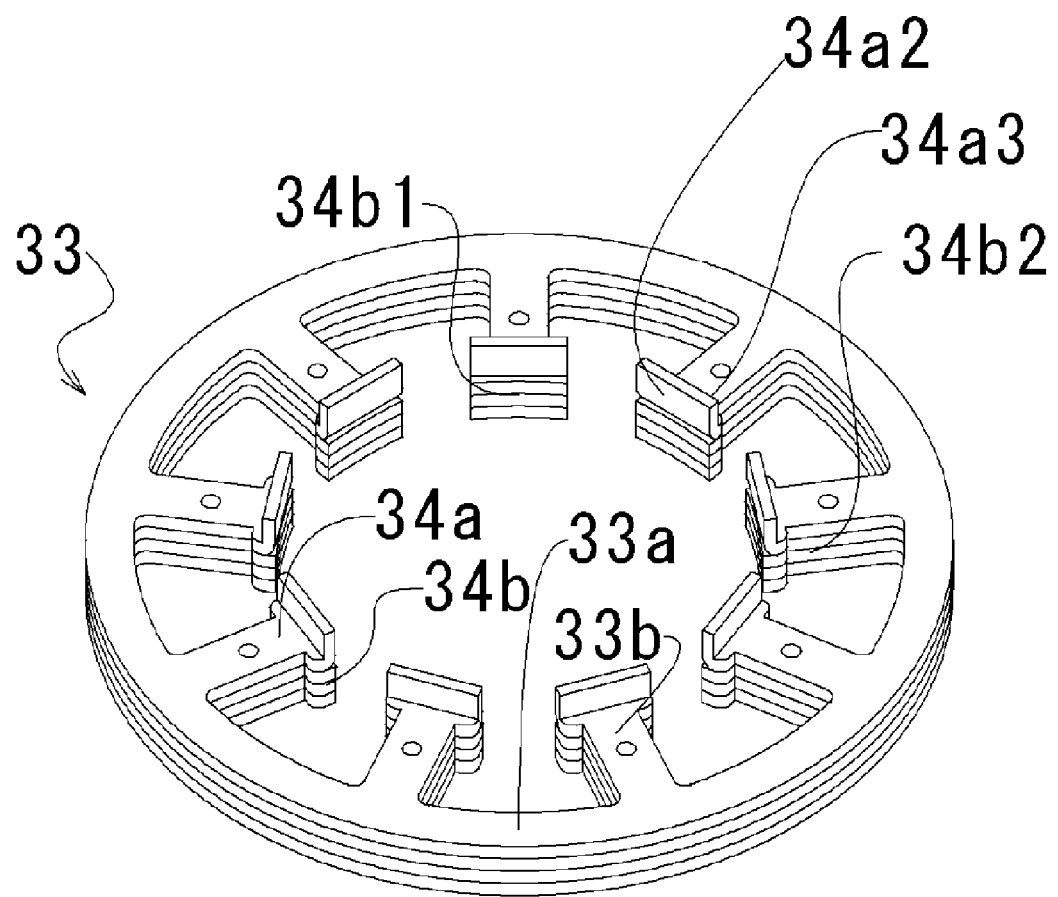
FIG. 3B is a perspective view showing the core in the spindle motor in the first preferred embodiment according to the present invention.

FIG. 3A is a plan view showing the core 33 in the first preferred embodiment, as viewed from top with reference to FIG. 2; and FIG. 3B is a perspective view showing the core 33. In addition, FIGS. 4A to 4C are views showing a magnetic pole tooth 33b of the core 33, in which only a tip of the magnetic pole tooth 33b facing to the rotor magnet 32 is enlarged. FIG. 4A is a plan view, as viewed from top in FIG. 2; and FIG. 3D is a plan view, as viewed from bottom in FIG. 2.

The core 33 includes an annular core back 33a positioned on an outer peripheral side of the stator 31, and the magnetic pole teeth 33b extending inward in a radial direction from the core back 33a. The core 33 is constituted of a plurality of core plates 34. A core plate laminated uppermost is a first core 34a formed by bending a piece of core plate 34. Furthermore, a second core 34b is constituted of a plurality of flat core plates 34 laminated under the first core 34a.

The first core 34a bent at an end on a center side of an extending portion has a bending portion 34a1, which is bent, and a vertical portion 34a2 facing to the rotor magnet 32 in a thickness direction. And further, the first core 34a has a second horizontal portion 34a3 laminated on the second core 34b in an axial direction.

A clearance between the vertical portion 34a2 of the first core plate 34a and the outer peripheral surface of the rotor magnet 32 is designed to be narrowest at the center in the circumferential direction of the vertical portion 34a2, which constitutes a plane parallel to a tangent at the outer peripheral surface of the rotor magnet facing to the narrowest portion.

The second core 34b constitutes the magnetic pole teeth 33b, and is provided with a facing surface 34b1 facing to the outer peripheral surface of the rotor magnet 32 in the radial direction, and a first horizontal portion 34b2 laminated on the second horizontal portion 34a3 of the first core plate 34a in the axial direction.

The vertical portion 34a2 forms a plane parallel to one of tangents of a circle or an arch constituting the outer peripheral surface of the rotor magnet 32. The vertical portion 34a2 is proximate to the rotor magnet 32 at the center in the circumferential direction of the magnetic pole tooth 33b, which is constituted of the vertical portion 34a2. The facing surface 34b1 is formed into an arcuate shape having a curvature radius greater than that of the outer peripheral surface of the rotor magnet 32. In the present preferred embodiment, the curvature radius of the facing surface 34b1 is designed to be substantially twice the curvature radius of the outer peripheral surface of the rotor magnet 32. Incidentally, the shapes of the plane constituting the vertical portion 34a2 and the arcuate surface constituting the facing surface 34b1 are defined from the viewpoint of a design, and cannot be departed from a scope in consideration of a range of an error in mechanic machining when the present invention is embodied.

1-4 Functions and Effects Produced by the Invention

Figure 5A:
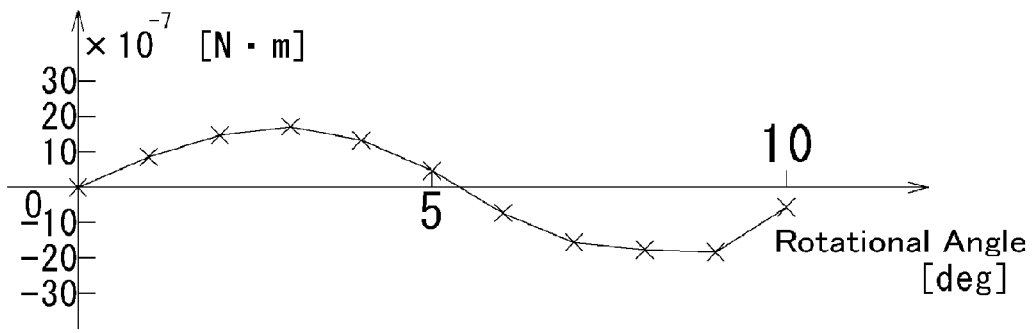
FIGS. 5A to 5C are graphs illustrating measurement results of waveforms of cogging torques relative to a second core 34b, a first core 34a and a core 33 as a combination of the first and second cores, respectively, out of the cores in the spindle motor in the first preferred embodiment according to the present invention.
Figure 5B:
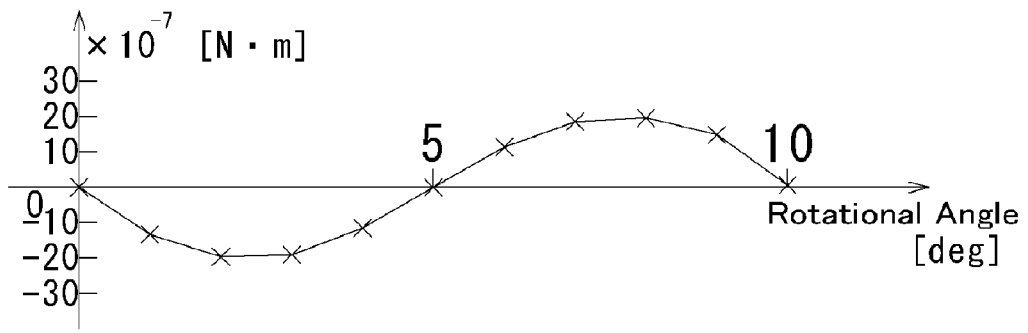
Figure 5C:
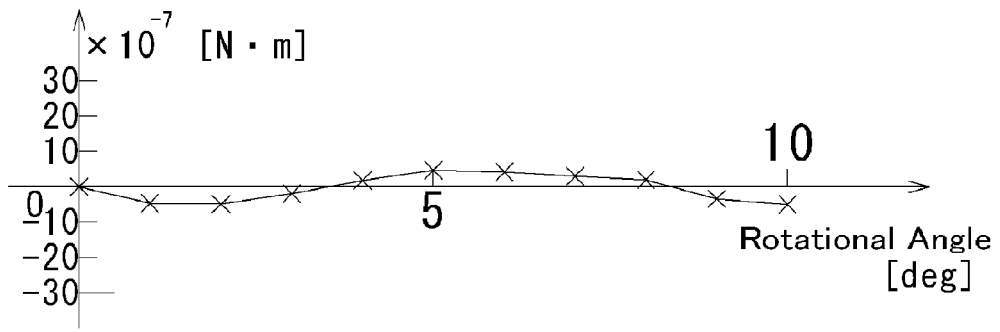

FIGS. 5A to 5C illustrate the measurement result of a cogging torque in the case of a coil is wound around each of three types of cores. In the present preferred embodiment, the motor is the 3-phase drive DC brushless motor. Moreover, the rotor magnet 32 is magnetized in a sinusoidal waveform, and further, the number of magnetic poles is 12. In addition, the number of magnetic pole teeth 33b in the stator 31 is 9. As a result, the cogging torque becomes 36 cycles per one rotation of the rotor magnet 32. FIGS. 5A to 5C illustrate one cycle of the cogging torque, that is, the measurement of the rotational angle of the rotor magnet 32 by 10°.

FIG. 5A illustrates the measurement of the cogging torque of the core consisting of only the second core in the present preferred embodiment. In contrast, FIG. 5B illustrates the measurement of the cogging torque of the core consisting of the core, in which the inner circumferential surface of the magnetic pole tooth facing to the outer peripheral surface of the rotor magnet 32 is constituted of the plane parallel to the tangent of the circle or the arch forming the outer peripheral surface of the rotor magnet 32, like the first core in the present preferred embodiment.

FIG. 5B illustrates the cogging torque of a phase reverse to that in FIG. 5A, in which the phase of the cogging torque is shifted by about Tr.

FIG. 5C illustrates the measurement of the cogging torque of the core 33 in a mode embodying the present invention, as described in Section (1-3). The core 33 includes the second core 34b exhibiting the property illustrated in FIG. 5A, and the first core 34a exhibiting the property illustrated in FIG. 5B. Therefore, the cogging torque of the second core 34b and the cogging torque of the first core 34a cancel each other, so that the cogging torque of the entire core can be reduced.

Otherwise, the waveform of the cogging torque of each of the cores may not be substantially sinusoidal, but may be more deformed. Even in such a case, cores exhibiting waveforms having phases reverse to each other are laminated one on another, thereby reducing the cogging torque of the entire core.

Figure 6:
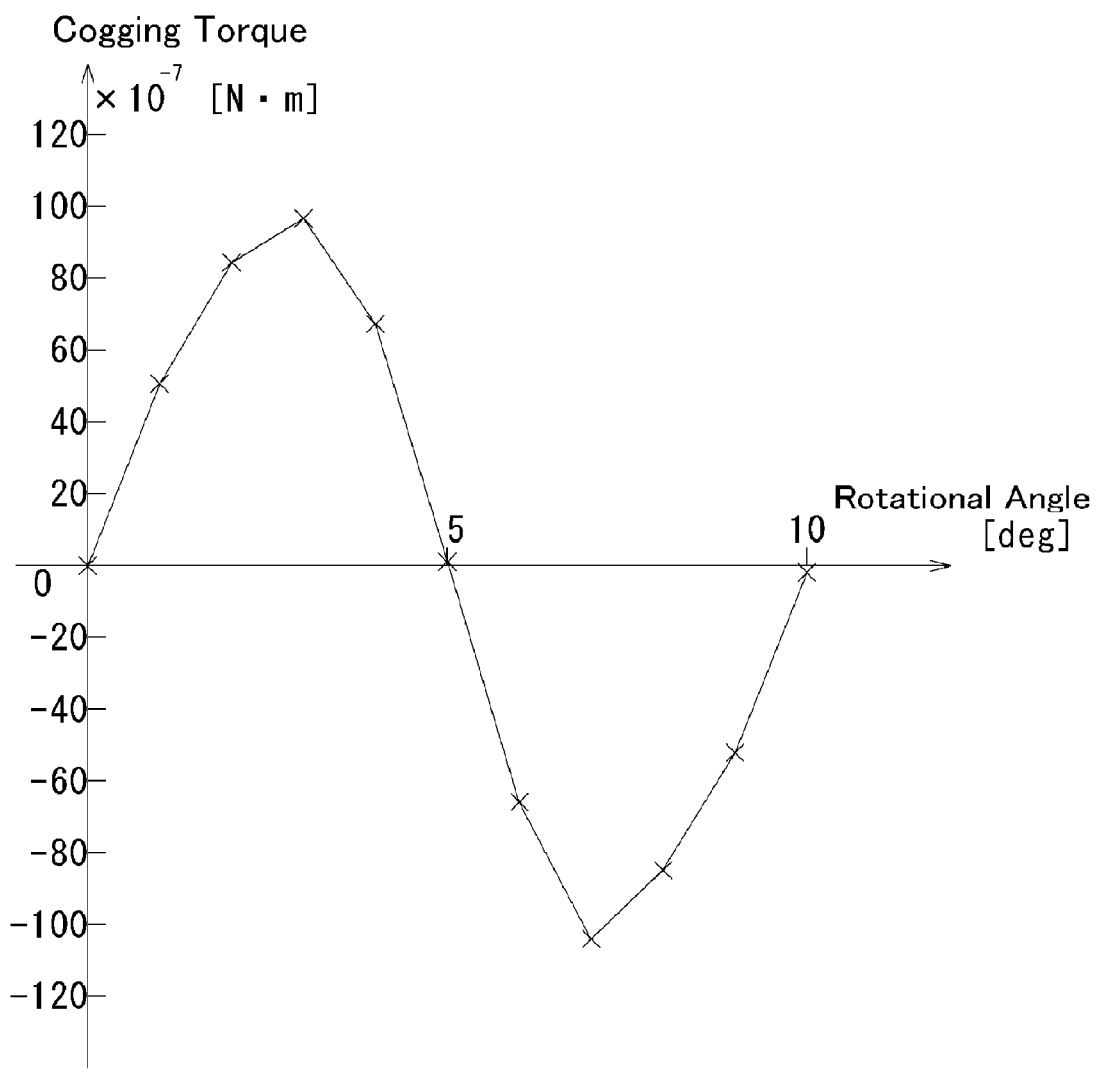
FIG. 6 is a graph illustrating a measurement result of a cogging torque waveform of a conventional core for use in a spindle motor in the prior art.
Figure 12A:
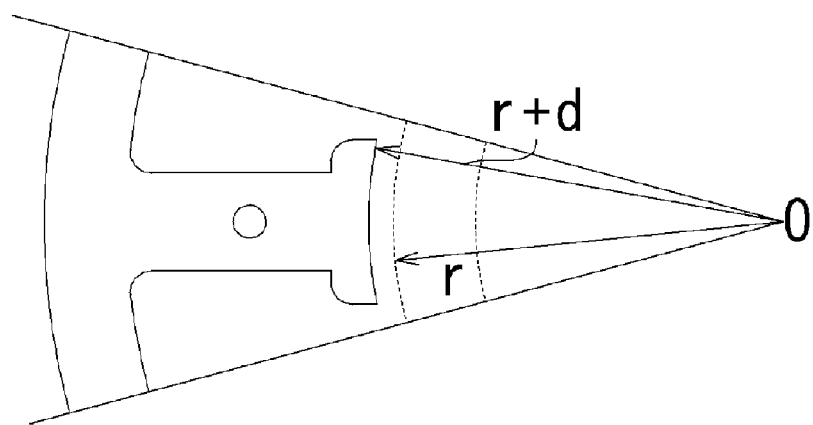
FIGS. 12A and 12B are views showing a core in a spindle motor in the prior art.
Figure 12B:
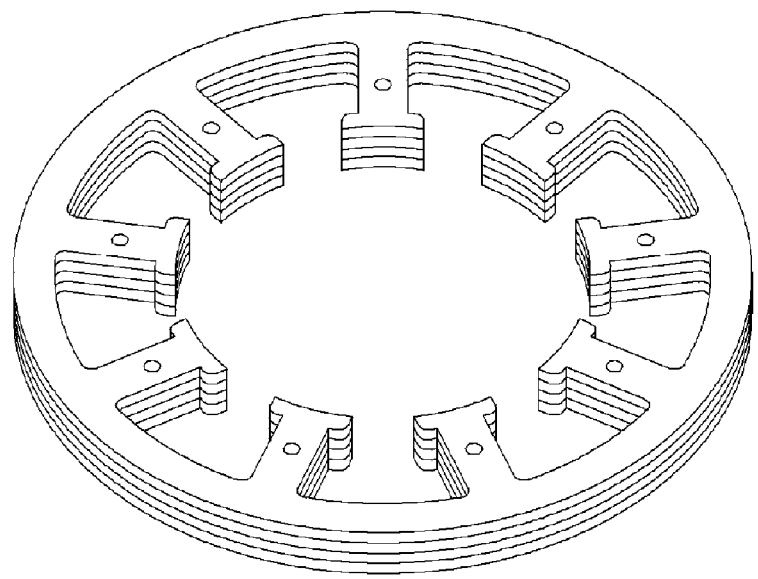

FIGS. 12A and 12B illustrate a core 330 for use in a conventional spindle motor having an inner circumferential surface consisting of an arch coaxial with the circle or the arch forming the outer peripheral surface of the rotor magnet 32. FIG. 6 illustrates a waveform of a cogging torque of the core 330 in the prior art. An average of a maximum value and an absolute value of the cogging torque in the core embodying the present invention is reduced down to about 1/20 in comparison with the core in the prior art.

Second Preferred Embodiment

A spindle motor in a second preferred embodiment is different from that in the first preferred embodiment in the shape of the core 33. Therefore, a description will be given of only features different from those in the first preferred embodiment.

Here, members having the same functions or effects in the description in the present preferred embodiment are designated by the same reference numerals as those used in the first preferred embodiment even unless they have similar shapes.

2-1 Shape of Core

Figure 3C:
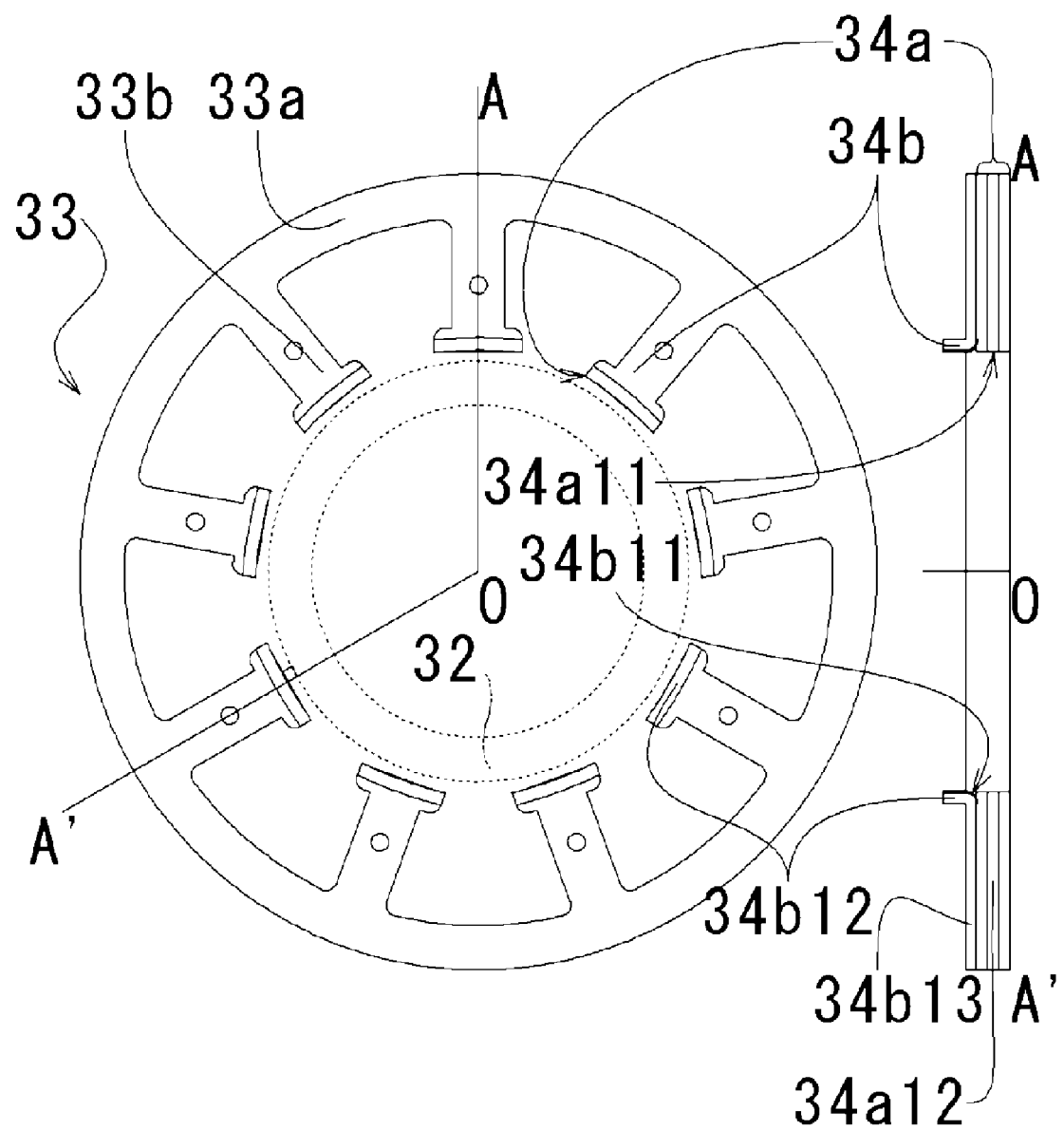
FIG. 3C is a plan view showing a core in a spindle motor in a second preferred embodiment according to the present invention.
Figure 3D:
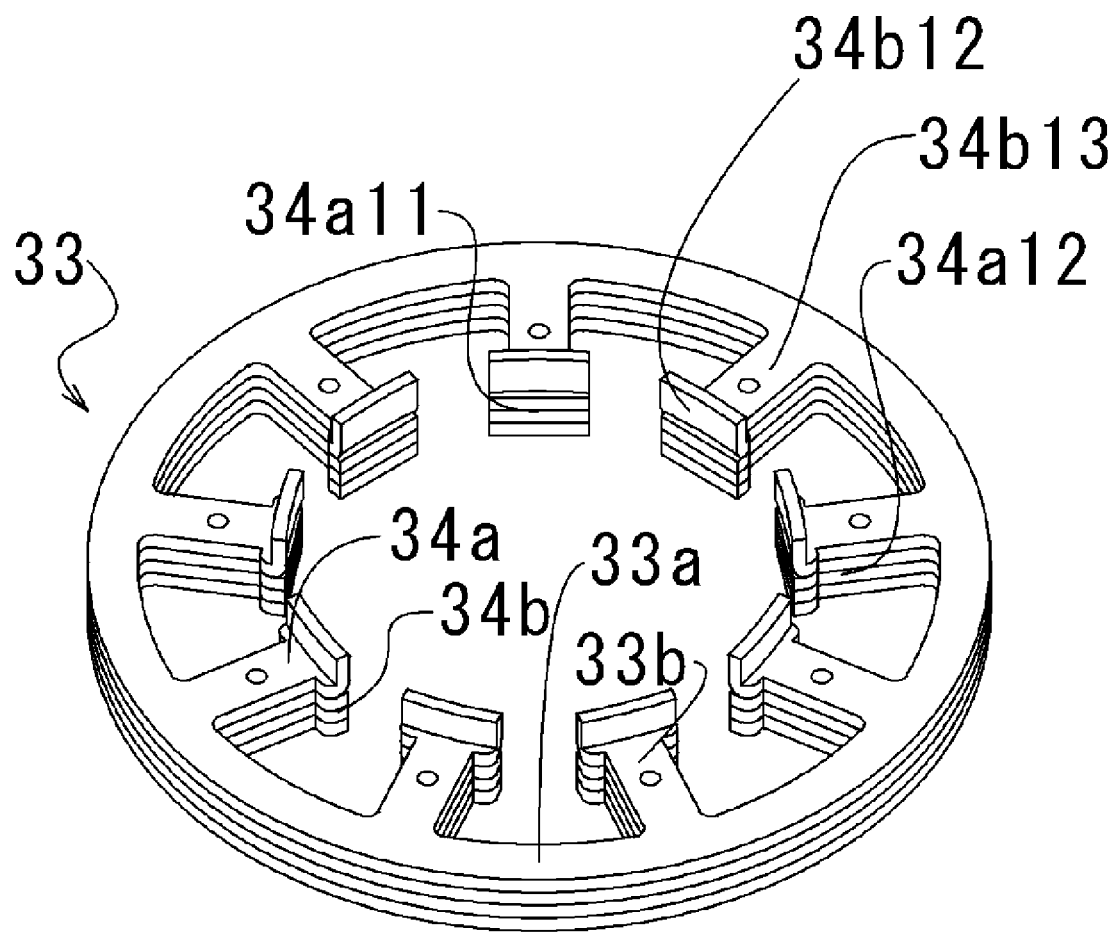
FIG. 3D is a perspective view showing the core in the spindle motor in the second preferred embodiment according to the present invention.
Figure 4A:
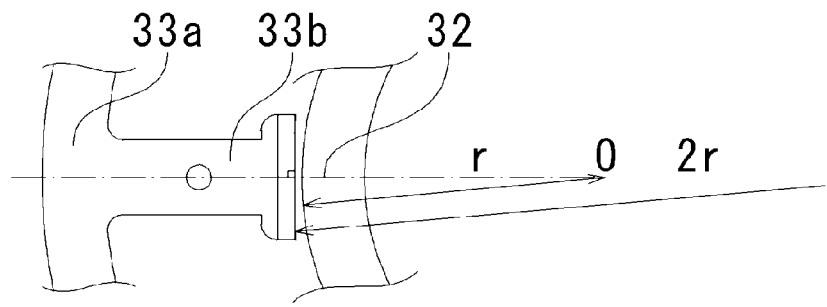
FIGS. 4A to 4C are enlarged views showing a magnetic pole tooth of the core in the spindle motor in the first preferred embodiment according to the present invention.
Figure 4B:
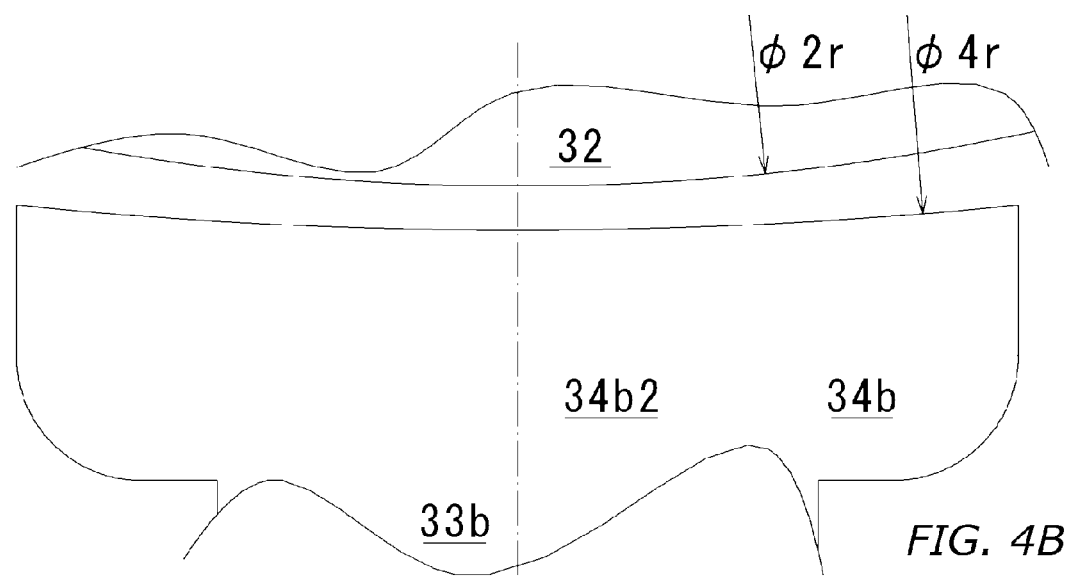
Figure 4C:
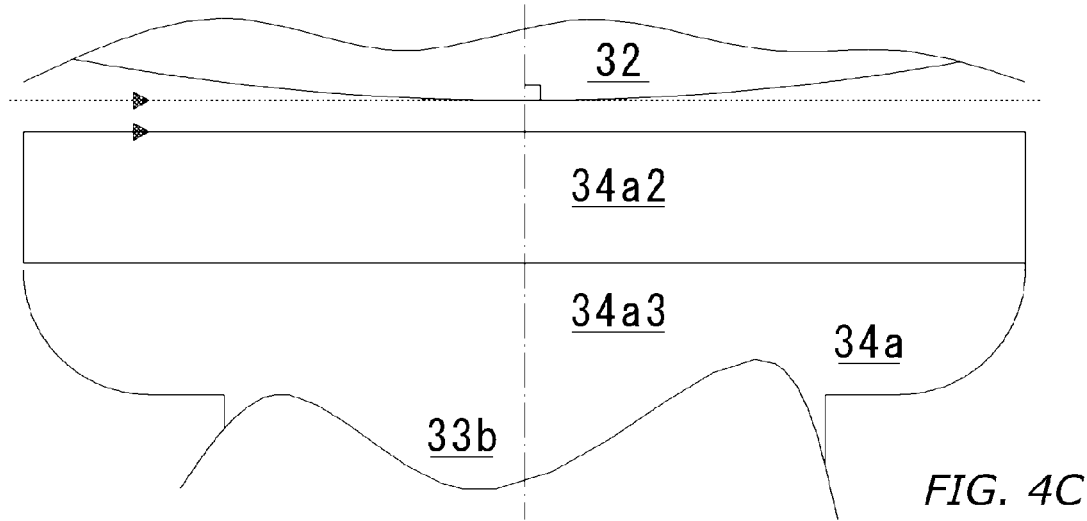

FIGS. 3C and 3D are a plan view and a perspective view showing the core 33 for use in a spindle motor 3 in the second preferred embodiment, respectively, as viewed from top in FIG. 2.

The core 33 includes a second core and a first core. A bent second core 34b is laminated on an uppermost side. Moreover, a first core 34a constituted of a plurality of flat core plates is laminated under the second core 34b.

The second core 34b has a bending portion 34b11 and a vertical portion 34b12 facing to a rotor magnet 32 in a thickness direction. And further, the second core 34b has a first horizontal portion 34b13 laminated on the first core 34a in an axial direction.

A clearance between the vertical portion 34b12 of the second core 34b and the outer peripheral surface of the rotor magnet 32 is designed to be narrowest at the center in the circumferential direction of the vertical portion 34b12. A surface of the vertical portion 34b12, facing to the rotor magnet is formed into an arch having a curvature radius greater than that of the outer peripheral surface of the rotor magnet 32. In the present preferred embodiment, the curvature radius of the inner circumferential surface of the vertical portion 34b12 is designed to be almost twice the curvature radius of the outer peripheral surface of the rotor magnet 32.

The first core 34a is provided with a facing surface 34a11, which forms an end of a magnetic pole tooth 33b and faces to the outer peripheral surface of the rotor magnet 32 in a radial direction, and a second horizontal portion 34a12 laminated on the first horizontal portion 34b13 of the second core plate 34b in the axial direction.

The facing surface 34a11 is proximate to the rotor magnet 32 at the center in the circumferential direction of the magnetic pole tooth 33b, and further, forms a plane parallel to one of tangents of a circle or an arch constituting the outer peripheral surface of the rotor magnet 32.

In the present preferred embodiment, the curvature radius of the facing surface 34b11 is designed to be about twice the curvature radius of the outer peripheral surface of the rotor magnet 32. Incidentally, the shapes of the plane constituting the vertical portion 34b12 and the arcuate surface constituting the facing surface 34b1 are defined from the viewpoint of a design, and should not be departed from a scope in consideration of a range of an error in mechanic machining when the present invention is embodied.

2-2 Functions and Effects Produced by the Invention

Functions and effects in the second preferred embodiment are identical to those in the first preferred embodiment. In other words, the planar shape of the tip of the magnetic pole tooth of the second core 34b in the first preferred embodiment is identical to the planar shape of the tip of the magnetic pole tooth of the second core 34b in the second preferred embodiment. Therefore, the same waveform appears when a waveform of a cogging torque is measured. Furthermore, the planar shape of the tip of the magnetic pole tooth of the first core 34a in the first preferred embodiment is identical to the planar shape of the tip of the magnetic pole tooth of the first core 34a in the second preferred embodiment. Therefore, the same waveform appears when the waveform of the cogging torque is measured.

Thus, the waveform of the cogging torque of the core in the present preferred embodiment, in which the second core 34b and the first core 34a are laminated in the axial direction, can be finally reduced since the cogging torque of the second core 34b and the cogging torque of the first core 34a cancel each other, like in the first preferred embodiment.

Third Preferred Embodiment

A spindle motor in a third preferred embodiment is different from the spindle motor 3 in the first preferred embodiment in the shape of the core. Therefore, a description will be given of only features different from those in the first preferred embodiment.

Here, members having the same functions or effects in the description in the present preferred embodiment are designated by the same reference numerals as those used in the first preferred embodiment even unless they have similar shapes.

3-1 Shape of Core

Figure 7A:
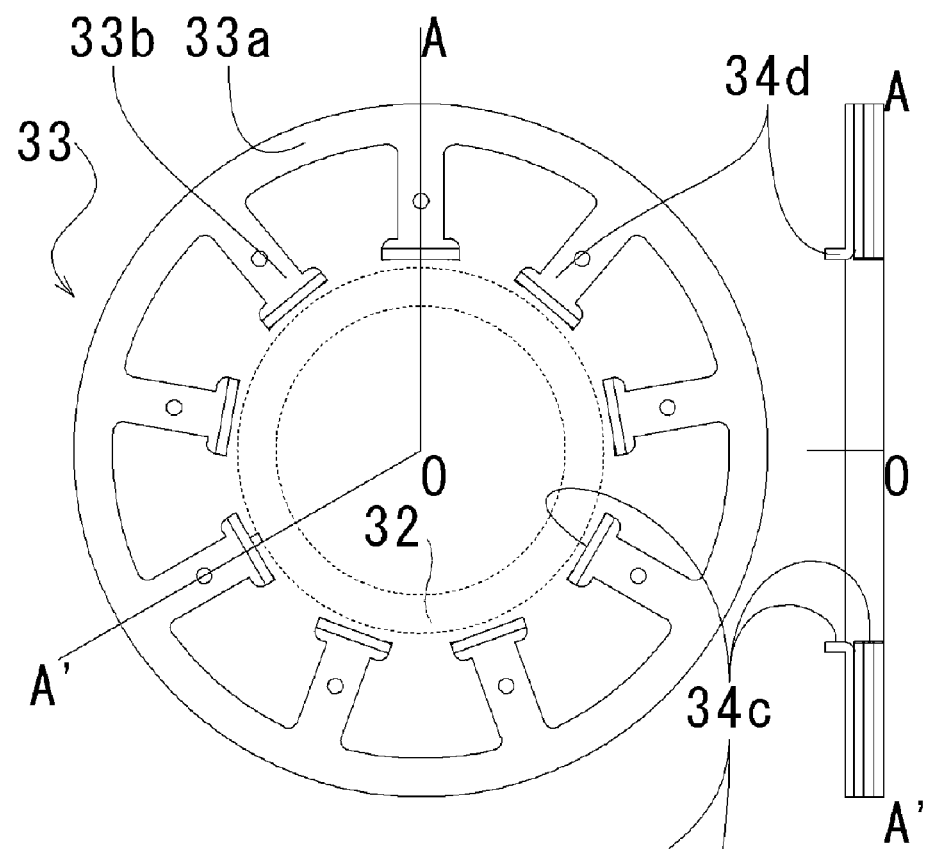
FIGS. 7A and 7B are views showing a core in a spindle motor in a third preferred embodiment according to the present invention.
Figure 7B:
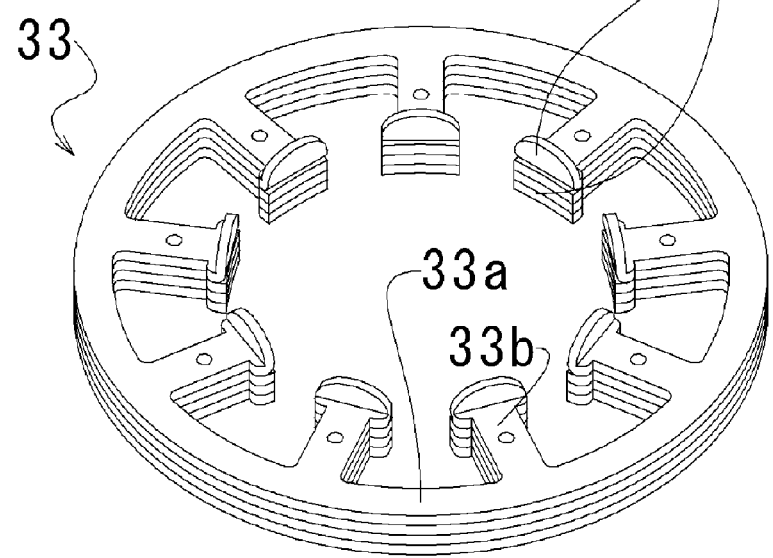
Figure 8C:
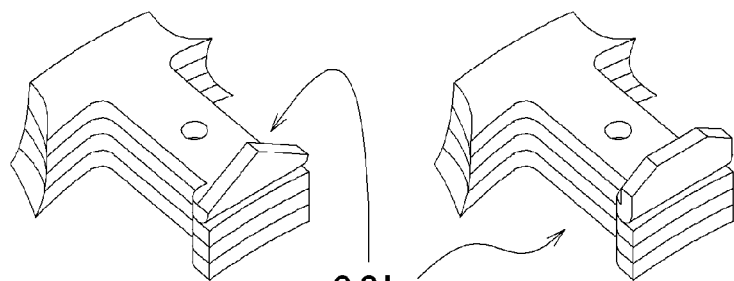
Figure 8D:
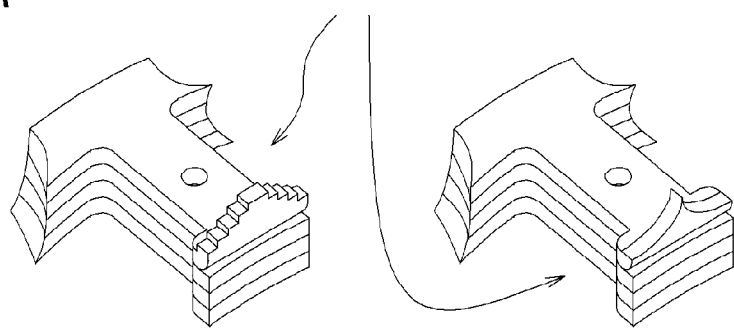

FIGS. 7A and 7B are a plan view and a perspective view showing a core 33 for use in a spindle motor 3 in the third preferred embodiment, respectively, as viewed from top in FIG. 2.

A core 33 includes an annular core back 33a positioned on an outer peripheral side and magnetic pole teeth 33b extending inward in a radial direction from the core back 33a. The core 33 is constituted of a plurality of core plates 34, out of which a bent core plate is designated by reference numeral 34d. An inner circumferential end of the core plate 34d is bent upward. An inner circumferential surface 34c in a thickness direction of the bent core plate 34d faces to a rotor magnet 32.

The inner circumferential surface 34c of the core 33 is formed of a plane parallel to a tangent of the facing rotor magnet 32. Moreover, the magnetic pole tooth is formed into a barrel, in which a center is high while both ends in a circumferential direction are low, as viewed inward in the radial direction.

In addition, the curvature of the inner circumferential surface 34c is designed to be greater than that of an outer peripheral surface of the rotor magnet 32. In particular, the curvature of the inner circumferential surface 34c of the bent core plate 34d is designed to be set greater than those of inner circumferential surfaces of other core plates 134.

3-2 Results of Embodiment

In the present preferred embodiment, a magnetized waveform of the rotor magnet 32 was sinusoidal, and further, an energization waveform to a coil 31a was 3-phase sinusoidal drive. A diameter of the rotor magnet 32 was about 13 mm; a clearance in a radial direction between a stator 31 and the rotor magnet 32 was 0.2 mm; the number of magnetic pole teeth of the stator 31 was 9; and the number of magnetic poles of the rotor magnet 32 was 8. Under such a condition, an experiment was conducted.

In the present preferred embodiment according to the present invention, a torque constant can be increased by 10% in comparison with the spindle motor using the conventional core 330 shown in FIGS. 12A and 12B. Additionally, an effective value of a cogging torque exhibiting the magnitude of cogging can be decreased down to about 1/10. Here, these numeric values are merely one example, and therefore, they may be varied according to various conditions such as the magnetized waveform of the rotor magnet, an energization method to the stator and a magnetic resistance of the entire spindle motor. However, effects are securely produced in regard to the increase in torque constant and the reduction of the cogging torque under the same conditions.

Fourth Preferred Embodiment

The present invention can be applied to a spindle motor 103 of an outer rotor type shown in FIG. 11A in a fourth preferred embodiment according to the present invention. A rotor magnet 32 is located outward in a radial direction of a core 133.

The core 133 is formed into a shape shown in FIG. 11B. Magnetic pole teeth 133b radially extend outward in the radial direction from an annular core back 133a. The core 133 includes a first core 134a and a second core 134b, which have ends of different shapes in the magnetic pole teeth 133b, respectively. The first core 134a has a first outer peripheral surface 134a1, which consists of an arch having a first curvature radius R1 of a circle coaxial with a circle forming an inner circumferential surface of the rotor magnet 133. Incidentally, the curvature radius of the first outer peripheral surface 134a1 should be defined within a range greater than 0.75 times (including a straight line having a curvature approximate to ∞), and further, should be greater than a second curvature radius, described below. In contrast, the second core 134b has a second facing surface 134b1 consisting of an arch having a second curvature radius r2 defined within a range smaller than 0.9 times a curvature radius R of the inner circumferential surface of the rotor magnet 133. Thus, the first curvature radius R1 is designed to be greater than the second curvature radius r2.

A cogging torque waveform exhibited by the first core 134a has a sinusoidal shape. In contrast, a cogging torque waveform exhibited by the second core 134b has a sinusoidal shape, in which a cycle is substantially the same as that of the cogging torque waveform of the first core 134a but a plus and a minus are inverted. Consequently, a cogging torque waveform exhibited by the core 133 having the first and second cores laminated one on another is a combination of these two cogging torque waveforms. In other words, the cogging torque waveform of the first core 134a cancels at least a part of the cogging torque waveform of the second core 134b, thereby reducing the cogging torque of the entire core 133.

The spindle motor 103 provided with the core 133 described in the present preferred embodiment is reduced in cogging, and thus, is reduced in loss of a torque, vibration and noise.

Other Preferred Embodiments

Although the method and the structure embodying the present invention have been described above, the present invention is not limited to the above-described preferred embodiments. Various alternations and modifications can be achieved without departing from the scope claimed in claims of the present invention.

Figure 10A:
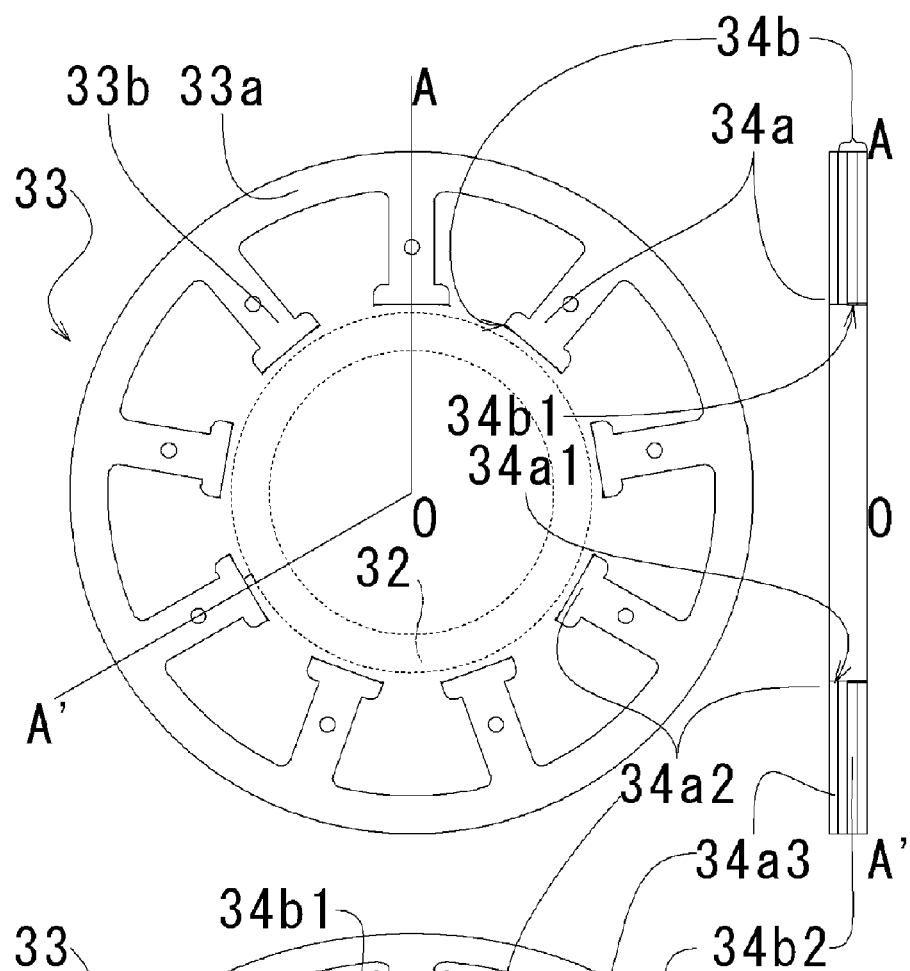
FIGS. 10A and 10B are views showing a core in a spindle motor in a still further preferred embodiment according to the present invention.
Figure 10B:
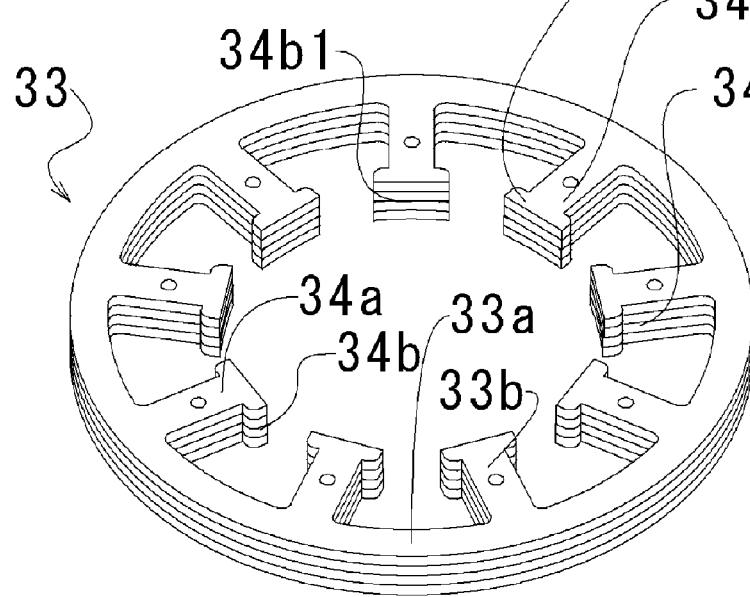

For example, the shape of a core in another preferred embodiment according to the present invention may mutually cancel at least a part of a counterpart cogging torque waveform by the effect of each of cogging torque waveforms of a first core and a second core, in which the cores having the two different inner circumferential shapes are laminated, as shown in FIGS. 10A and 10B. Even if the first core and the second core are so-called flat cores, in which a tip of a magnetic pole tooth 33b of each of the first core and the second core is not bent in a substantially vertical manner, the effect of the present invention can be produced.

Furthermore, the number of magnetic pole teeth in a stator and the number of magnetized poles of a rotor magnet may be appropriately determined in accordance with required specifications or the like. For example, it has been known that a cycle of cogging per rotation becomes a least common multiple of the number of magnetic pole teeth and the number of magnetized poles of a rotor. As a consequence, it may be effective in reducing cogging or the like by setting the number of magnetic pole teeth and the number of magnetized poles such that the least common multiple becomes large.

Incidentally, the magnetic pole tooth facing to the rotor magnet may be formed into a trapezoidal shape, a stepwise shape reduced in height toward both ends, an isosceles triangular shape and a needle-like shape, respectively, as shown in FIGS. 8A to 8D. A shape, by which the cogging can be most suppressed, can be appropriately selected and improved in accordance with properties of the cogging.

Figure 9A:
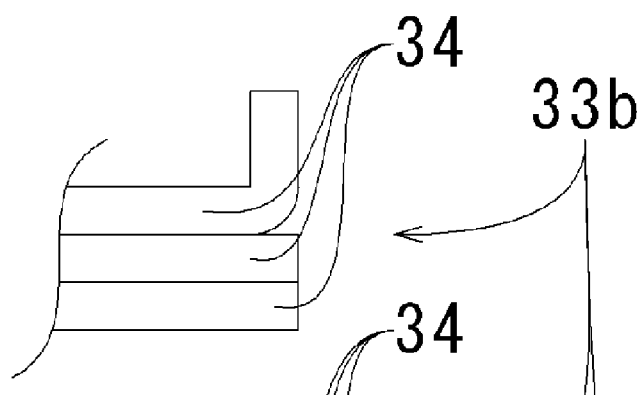
FIGS. 9A to 9C are cross-sectional views showing cores, which are laminated and bent, in a spindle motor in a further preferred embodiment according to the present invention.

Additionally, as shown in FIG. 9A, a core plate positioned at either of an upper end and a lower end in an axial direction may be bent in such a manner as to cover other core plates. In this way, the bent core plate can has a largest surface facing to a rotor magnet, thereby effectively increasing a torque constant.

Figure 9B:
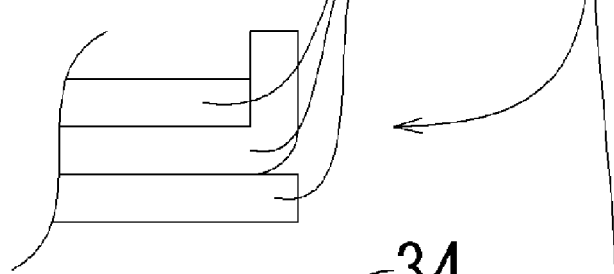

Otherwise, as shown in FIG. 9B, a core plate other than core plates laminated at an upper end and a lower end in an axial direction may be bent upward or downward.

Figure 9C:
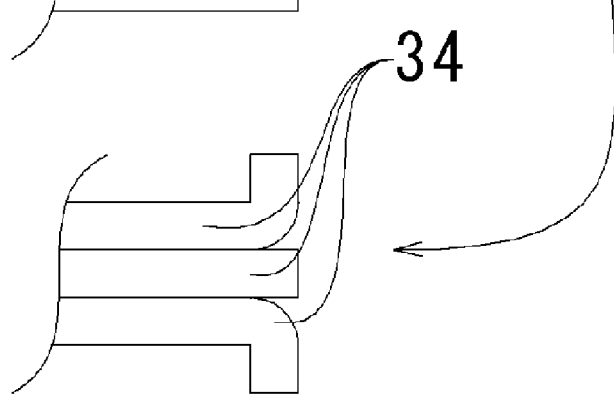

Alternatively, as shown in FIG. 9C, two or more core plates may be bent upward and downward, respectively. In this way, even if a center position of a stator is changed, the stator can be located at an optimum position only by changing the height of a bent portion of the core plate.

In addition, other constituent elements of a spindle motor can be optimized in accordance with carrying-out usage.

A bearing may be a dynamic pressure bearing or a slide bearing in other modes. Or, a so-called rolling-element bearing constituted between an outer race and an inner race via a rolling element.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the present invention which fall within the true spirit and scope of the invention.

What is claimed is:

1. A motor comprising:
   a rotor magnet, which has a cylindrical circumferential surface representing a circular cross section and has a plurality of magnetic poles circumferentially arranged about its center axis;
   a first core section having first radially inward extending teeth portions each terminating in a flat tooth-end portion paralleling a plane tangent to the circumferential surface of the rotor magnet;
   a second core section having second radially inward extending teeth portions each terminating in a curved tooth-end portion facing the circumferential surface of the rotor magnet along a predetermined radius of curvature, with at least the second tooth-end portions being axially laminated to the first tooth-end portions, thereby together constituting magnetic pole teeth;
   a coil, which is fixed to the magnetic pole tooth;
   a rotor, which holds the rotor magnet therein; and
   a bearing mechanism, which rotatably supports the rotor relative to the core.

2. A motor according to claim 1, wherein:
   the first core is constituted of a single core plate having a vertical portion substantially vertically bent on one side in the axial direction at the end of the arm portion facing to the peripheral surface of the rotor magnet; and
   the second core is constituted of one or more flat core plates, which are laminated on the other side in the axial direction of the first core.

3. A motor according to claim 1, wherein:
   cogging force caused by magnetic interaction between the end of the first core in the radial direction and the peripheral surface of the rotor magnet exhibits a first waveform with respect to the rotational angle of the rotor magnet relative to the first core; and
   cogging force caused by a magnetic interaction between the end of the second core in the radial direction and the peripheral surface of the rotor magnet exhibits a second waveform with a phase reverse to that of the first waveform with respect to the rotational angle of the rotor magnet relative to the first core.

4. A recording disk drive device comprising:
   a spindle motor, which includes the motor according to claim 1 and a rotor hub rotated integrally with the rotor;
   a recording disk, which is fixed to the rotor hub;
   information access means, which has the function of reading information stored in the recording disk; and
   a casing, which contains therein the spindle motor, the recording disk and the information access means.

* * * * *